United States Patent [19]

Lippold

[11] Patent Number: 5,066,319

[45] Date of Patent: Nov. 19, 1991

[54] FILTER CARTRIDGE

[76] Inventor: Hans-Joachim Lippold, Wredeweg 8, D-1000 Berlin 22, Fed. Rep. of Germany

[21] Appl. No.: 474,290

[22] Filed: Feb. 5, 1990

[30] Foreign Application Priority Data

Feb. 8, 1989 [DE] Fed. Rep. of Germany ....... 3903698
May 19, 1989 [DE] Fed. Rep. of Germany ....... 3916838

[51] Int. Cl.$^5$ .............................................. B01D 46/52
[52] U.S. Cl. ........................................ 55/521; 55/497; 55/528
[58] Field of Search .................. 55/492, 497, 521, 527, 55/528

[56] References Cited

U.S. PATENT DOCUMENTS

| | | | |
|---|---|---|---|
| 3,388,536 | 6/1968 | Nash | 55/492 |
| 3,397,518 | 8/1968 | Rogers | 55/497 |
| 3,531,920 | 10/1970 | Hart | 55/521 X |
| 3,941,571 | 3/1976 | Getzin | 55/521 X |
| 4,041,203 | 8/1977 | Brock et al. | 428/157 |
| 4,268,290 | 5/1981 | Barrington | 55/521 |
| 4,547,950 | 10/1985 | Thompson | 55/521 X |
| 4,615,804 | 10/1986 | Wright | 55/521 X |
| 4,619,675 | 10/1986 | Watanabe | 55/521 X |

FOREIGN PATENT DOCUMENTS

| | | |
|---|---|---|
| 1930715 | 11/1970 | Fed. Rep. of Germany. |
| 2138412 | 3/1973 | Fed. Rep. of Germany. |
| 2813356 | 10/1978 | Fed. Rep. of Germany. |
| 2922237 | 12/1979 | Fed. Rep. of Germany. |
| 2835181 | 9/1984 | Fed. Rep. of Germany. |
| 8704427 | 7/1987 | Fed. Rep. of Germany. |
| 8390002 | 11/1987 | Fed. Rep. of Germany. |
| 1059010 | 3/1954 | France. |
| 2427123 | 12/1979 | France. |

OTHER PUBLICATIONS

European Search Report for Application No. EP 90250039, dated Apr. 26, 1990.

Primary Examiner—Richard L. Chiesa
Attorney, Agent, or Firm—Spencer & Frank

[57] ABSTRACT

Filter cartridge, in particular with a block-like construction, including a plurality of fold walls created by folding in a zig-zag fashion for a medium to be filtered to pass through from one edge area of the zig-zag folding in the direction of the edge area of the folding on the opposite side made of a material which can be permeated by the medium to be filtered provided with offsets formed by roll forming which extend out on both sides of each fold wall in the direction of flow of the medium and, in particular, are of a length which is greater than their width whereby the offsets of adjacent fold walls lie in contact with one another as spacers and stiffeners and that the height of the offsets lying in contact with one another of two fold walls connected together by a fold edge increases in the direction of the opposite fold edge and that therefore the spacing between two adjacent fold walls decreases uniformly in the direction of flow until the medium passes through the fold wall from which point on the spacing increases, whereby the offsets are of a constant width perpendicular to the direction of flow and that the side faces of the offsets run vertical to the folds which connect together the fold walls.

25 Claims, 6 Drawing Sheets

FILTER CARTRIDGE

CROSS REFERENCE TO RELATED APPLICATION

This application claims the priority of Federal Republic of Germany Application No. P 39 03 698.7 filed Feb. 8, 1989, which is incorporated herein by reference.

BACKGROUND OF THE INVENTION

This invention relates to filter cartridges.

A known filter cartridge is described in U.S. Pat. No. 3,531,920 and has a block-like form and comprises a filter element in which the filter material is folded in a zig-zag fashion. The filter material is provided with offsets which extend out of the plane of the filter material on both sides in parallel lines, i.e., as raised portions and as recesses. The surfaces of the offsets of two adjacent fold walls are in contact with each other when the filter material is folded. Each offset which lies perpendicularly in relation to the crease in the filter material which creates a fold becomes wider in the direction of increasing height or depth of the offset. In a fold wall adjacent offsets protrude in opposite directions; i.e., as raised portions and recesses.

The offsets in the fold walls are arranged in such a way that an offset in the form of a raised portion on one fold wall is in contact with an offset in the form of a raised portion on the adjacent fold wall. Due to the folding in a zig-zag fashion the offsets of the fold walls are in contact with each other and are supported in the region of the contact area.

In this way the spacing between two adjacent fold walls decreases uniformly in the direction of flow until the medium to be filtered passes through the filter media from when on the spacing increases uniformly.

A drawback of this arrangement is that the width of the offsets varies in the direction of flow so that the medium to be filtered is deflected sideways. The resistance to flow of the medium to be filtered increases and a greater throughput is therefore required. The increasing width of the offsets also decreases the available filter area in the region of the fold walls.

In addition the width of the channel which is formed between two sets of adjacent offsets increases in the direction of flow. Due to the accompanying change in cross-section the resistance to flow is again increased in an undesirable fashion. To be able to filter larger quantities of a medium economically one must try to minimize the amount of energy required as well as taking into consideration the fact that motors are louder the more powerful they have to be.

SUMMARY OF THE INVENTION

It is an object of the invention to provide a filter cartridge of the above-mentioned type, in which the resistance to flow is greatly minimized whist at the same time using a simple construction which is nevertheless of great stability.

The above and other objects are accomplished according to the invention by utilizing the realization that on the one hand the path travelled by the medium to be filtered should be as short and as straight as possible and that on the other hand the change in the cross-section of a channel to be passed through by the medium should be the same as the surface area of the filter material for the medium available in that region where the change in cross-section occurs. In this way it is guaranteed that with a laminar flow the whole surface of the filter material is evenly used for filtering and that no pressure variations occur along the path travelled by the medium to be filtered. These could otherwise increase the flow resistance in an undesirable fashion. The filter action is more uniform and the filter does not have to be changed as often even though the filter efficiency has increased.

It is particularly advantageous that the width of the channels is large compared to the ribs formed by the offsets so that a favorable relationship can be obtained between the available filter surface area and the total surface area of the fold walls.

In this way block-like disposable filter cartridges with a long operational life-span can be produced cheaply. The fold walls which are of a filter material need not be held apart by distancers or the like.

An advantageous feature of the invention is that the offsets are coated and/or soaked with a material which is self-hardening so as to increase the rigidity of the embodiment. The side faces of the offsets are also coated or soaked with the material as these act as stiffening ribs for the fold walls.

It is, in particular, advantageous to increase the thickness of the coating or the intensity of the soaking in the direction away from the pane of the filter material as the resulting tapered walls of the offsets are more rigid and more stable. The material can be preferably coated or soaked with a hardening adhesive material.

The area of transition between the offset and the plane of the filter material is formed to have good flow characteristics in the region of the offset which is the largest distance away from the plane of the filter material. The formation is such that an area of greater incline lies between areas of lesser incline. In addition the areas with lesser incline, in particular, continually and gradually run into the adjacent level areas. The pressure differences in the entrance areas of the filter material are smaller for the medium to be filtered and the flow is approximately laminar.

In a further preferred embodiment the fold edges are formed in a trapezoid-like shape at the bottom of the folds. The pressure distribution is more even and, in particular, the fold wall can be of a greater height than in the other embodiments without undesirably high pressure differences occurring when the medium to be filtered passes through the filter material. These small pressure differences are, in particular, caused by the minimally greater concentration of material at the fold edge and could possibly also be caused by the medium to be filtered having a greater available filter surface area in this region. The advantageous laminar flow which is advantageous for the filter process is still on hand. The greater height of the fold walls does not only increase the filter area but betters all the filter characteristics and in particular the filter efficiency. The wider construction of the fold edge leads to a much better relationship of the pressure difference to the fold height. This leads to a greater rigidity and a longer operational life-span of each filter cartridge.

In another advantageous embodiment of the invention the adhesive material is placed on the offsets, in particular on the raised portions, in a net-like or spun fashion. In this way a total closure of the surface area of the filter material is prevented. Even though the filter material is rigid enough its filter characteristics are only slightly impaired. In addition the amount of adhesive material required is reduced so that the material costs are lowered.

In another preferred embodiment the filter cartridge comprises at least in part some thermoplastic fibres so that a wanted lasting deformation and areas of higher rigidity can be achieved by heat treatment which can be carried out by welding the filter material in the filter layer. Even though the welding increases the material density the filter characteristics are not or only slightly impaired. The filter characteristics are in any case much better than those of filter material with binders. Due to the possibility of binding together individual filter layers which means that the separation of individual layers can be prevented as well as the improved longitudinal and horizontal rigidity the filter materials according to the invention are foldable and usable for the normal filter uses.

The filter media consist of plastic fibre material and have a higher filter efficiency and lower pressure differences than the usual glass fibre materials. This results in a lower required throughput and a longer operational life-span of the filter cartridges. In addition a reduction of the required throughput leads to a reduction in noise of the motor means. It is furthermore advantageous that by pressing the offsets into the filter material the fold walls have a good stability despite their smaller wall thickness. The filter area can therefore be increased by using a smaller number of offsets. The resistance to flow is also lowered and a homogenous type of flow is guaranteed. This results in a lower suction rate, a less noisy filter and a longer operational life of the filter cartridge.

The thermoplastic and in part welded fibres cause the stability and the rigidity of the filter cartridge to be increased in certain areas, in particular at the offsets, in areas of transition and at the fold edges. The reduction in the number of offsets due to this is also advantageous as a favorable relationship can be achieved between the effective filter surface area and the total surface area of the fold walls. The filter cartridges can be produced as disposable filters at a low cost and have a long operational life-span. The filter walls are of a thermoplastic material and do not require fixed spacers or stiffeners of non-filter material.

The fibres are connected together in the welded state without any appreciable air voids. The permeable filter material is multi-layered whereby individual layers are welded together in part so as to prevent the individual layers from separating. It is furthermore advantageous if the permeable filter material consists of fibres, or at least fibre parts, such as polypropylene, cellulose, polycarbonate, polyamide, TEFLON® (E. I. DuPont) polytretrofluoroethylene, and/or polyester. This composition ensures that there is a sufficient amount of thermoplastic material in the filter material and that the filter characteristics are suited to the requirement. It is advantageous to construct the seam-like welded areas in the form of joint lines.

BRIEF DESCRIPTION OF THE DRAWINGS

FIG. 1b is a plan elevation of the filter material according to FIG. 1a.

DESCRIPTION OF THE PREFERRED EMBODIMENTS

Figure 1A:
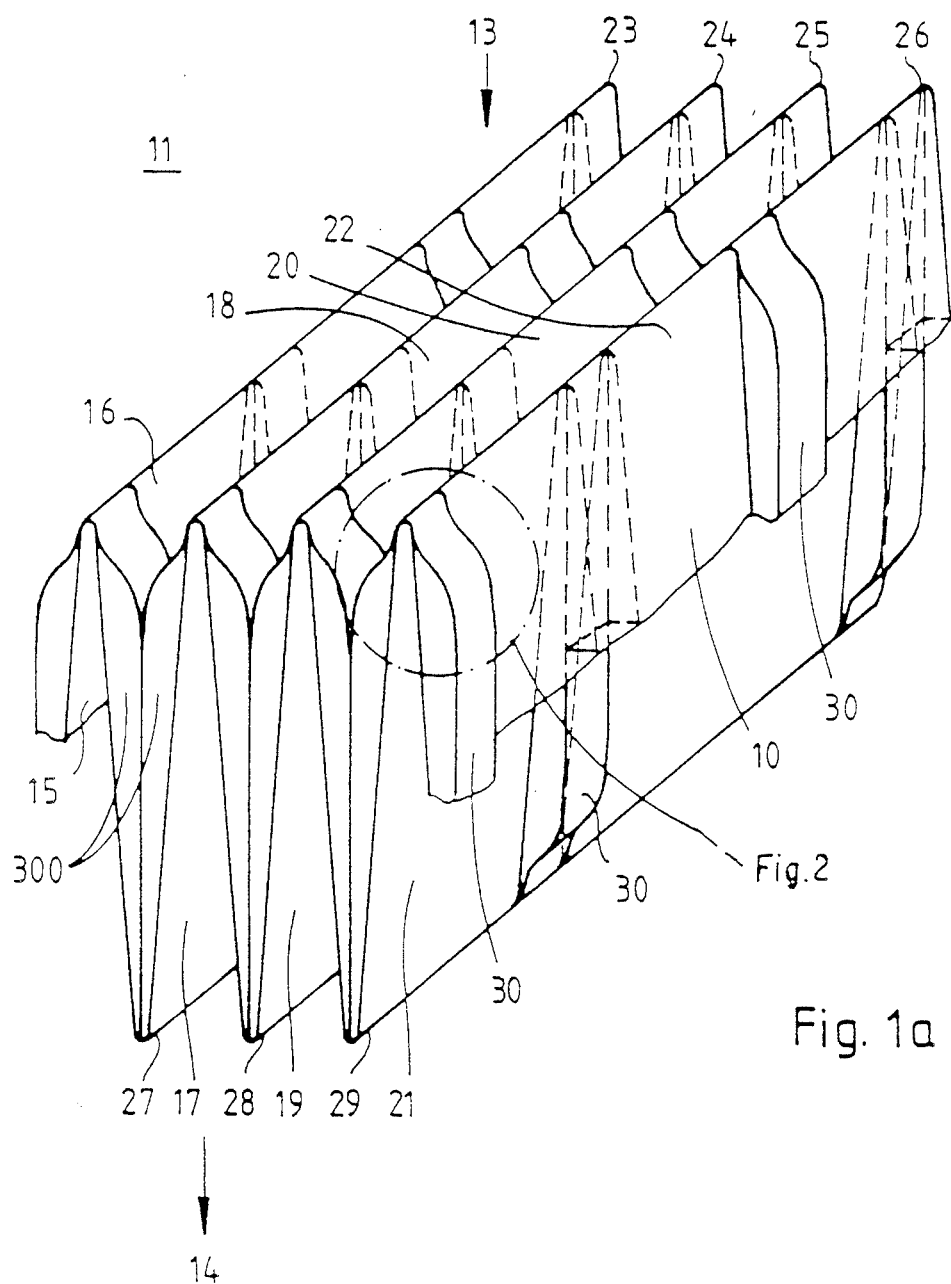
FIG. 1a is a perspective view of a part of a preferred embodiment of the filter material.
Figure 1B:
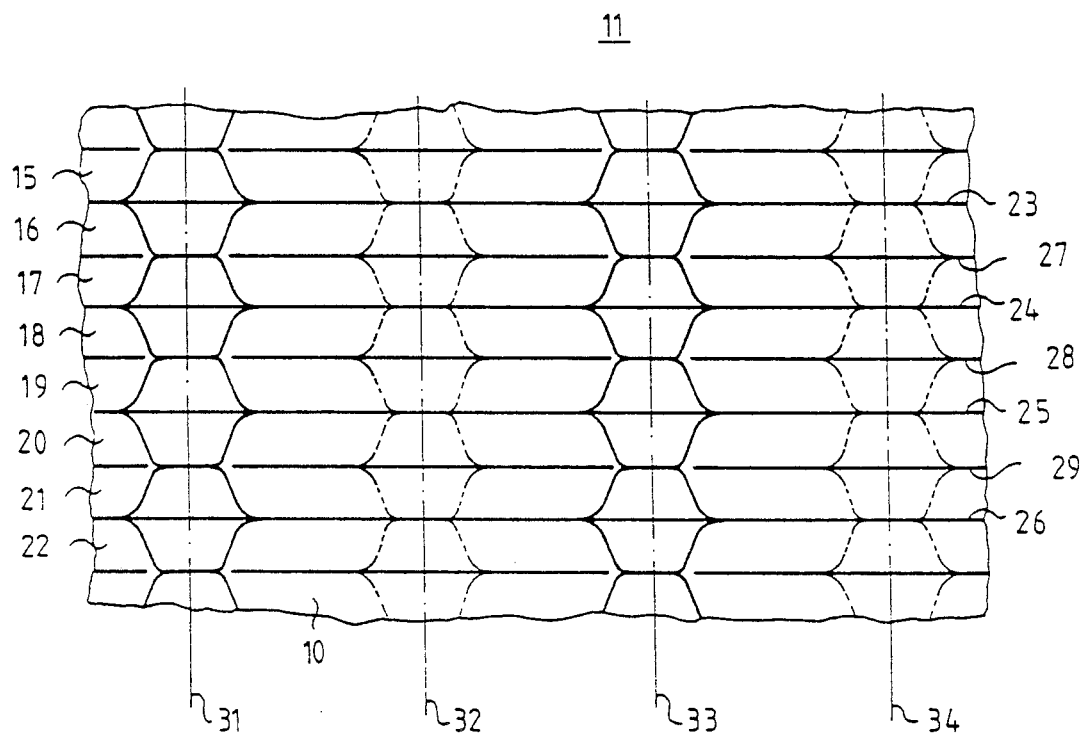
Figure 4:
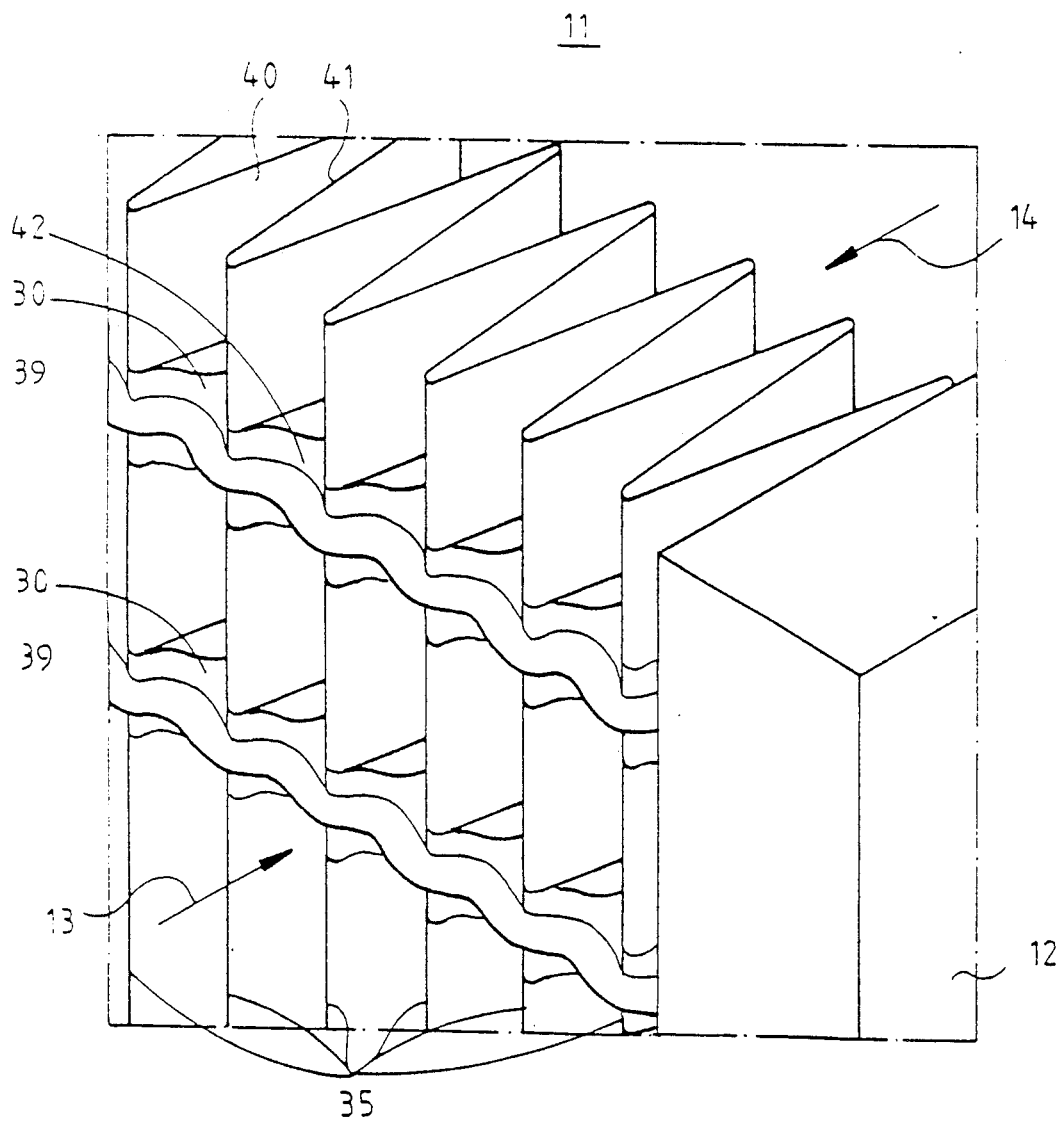
FIG. 4 is a perspective plan view of a preferred embodiment of the filter material folded to a filter cartridge showing the holding means for the folds.

Turning to the FIGS. 1a, 1b and 4, a part of the preferred embodiment of the filter material 10 consisting of a filter matting is shown, which by zig-zag folding can be formed into a block-like filter cartridge 11. This filter matting is in particular a filter matting for suspended particles. In principle any filter material can be used which can be formed in the desired fashion.

The block-like filter cartridge 11 fits in a known way into a frame 12, which further stabilizes the filter cartridge. The filter cartridge can, according to the required use, also be constructed in a frameless fashion in which case the outer measurements are constructed in accordance with the recess into which it is to be fitted. The medium to be filtered flows from the entrance side 13 through the filter cartridge in the direction of the exit side 14 on the opposite side from where it is either extracted via an extraction pipe or flows out freely.

The filter material 10 in FIG. 1a and 1b is folded in a zig-zag fashion in which a number of fold walls 15 to 22 form one fold each. The fold walls 15 and 16 are connected together by a fold 23 on the entrance side 13. The fold walls 17 and 18 are similarly connected together by a fold 24, the fold walls 19 and 20 by a fold 25 and the fold walls 21 and 22 by a fold 26. The fold walls 16 and 17 are connected together by a fold 27 on the exit side 14. The fold walls 18 and 19 are similarly connected together by a fold 28 and the fold walls 20 and 21 by a fold 29. This folding enlargens the filter surface area and thereby enlargens the filter efficiency of the filter cartridge 11. This is caused by the optimization of the acceleration distribution and the reduction of the pressure difference. The operational life-span is longer than that of the usual equivalent filters.

The fold walls 15 to 22 have offsets 30 made of the same material, which are created by roll forming the filter material (filter matting for suspended particles). The offsets 30 are of constant width in the direction of flow of the medium to be filtered. The width is smaller than the greatest height of the offsets as measured from the plane of the panel fold wall. The side faces 300 of the offsets 30 run perpendicularly to the folds 23 to 29 which connect together the fold walls 15 to 22. The height of the offsets 30 as measured from the plane of the fold walls 15 to 22 constantly increases in the direction away from the folds 27 to 29 towards the folds 23 to 26.

The contact region of the offsets 30 is rectangular in shape. In this way the stability of the filter cartridge is enhanced. The surface area of the filter element has been increased by roll forming the fold walls 15 to 22 and the additional material required was obtained from the fold wall to be roll formed during the roll forming operation. The walls of the offsets 30 are therefore thinner. The application of adhesive makes just these areas more rigid so that the weakening of the material due to the deformation process is eliminated or in some cases, depending on the amount of adhesive applied, more than compensated for.

The offsets 30 of adjacent fold walls 15 to 22 lie in contact with each other and act as spacers and enhance the rigidity. For example the height of two offsets 30, which lie in contact with each other, of the fold walls 16 and 17 which are connected together by the fold 27 constantly increase in the direction of the folds 23 and 24 on the opposite side as measured from the plane of the fold walls 16 and 17 respectively. In this way the spacing between the two fold walls 16 and 17 decreases in the direction of flow of the medium to be filtered until the medium to be filtered passes through the respective fold wall 16 or 17 from when on the spacing increases. In this way it is guaranteed that with a laminar flow the whole surface of the filter material is evenly used for filtering and that no pressure variations occur along the path travelled by the medium to be filtered. These could otherwise increase the resistance to flow in an undesirable fashion.

The offsets 30 are situated along the lines 31 to 34 which are equally spaced apart from each other. The offsets are situated alternately on either side 13 and 14 in such a way that the offsets 30 are on entrance side 13 on lines 31 and 33 and the offsets 30 are on the exit side 14 on lines 32 and 34. The stability is greater due to the alternating position of the offsets 30 as the fold walls are not only positioned apart with a set spacing on the entrance side 13 but also the exit side 14.

Figure 2:
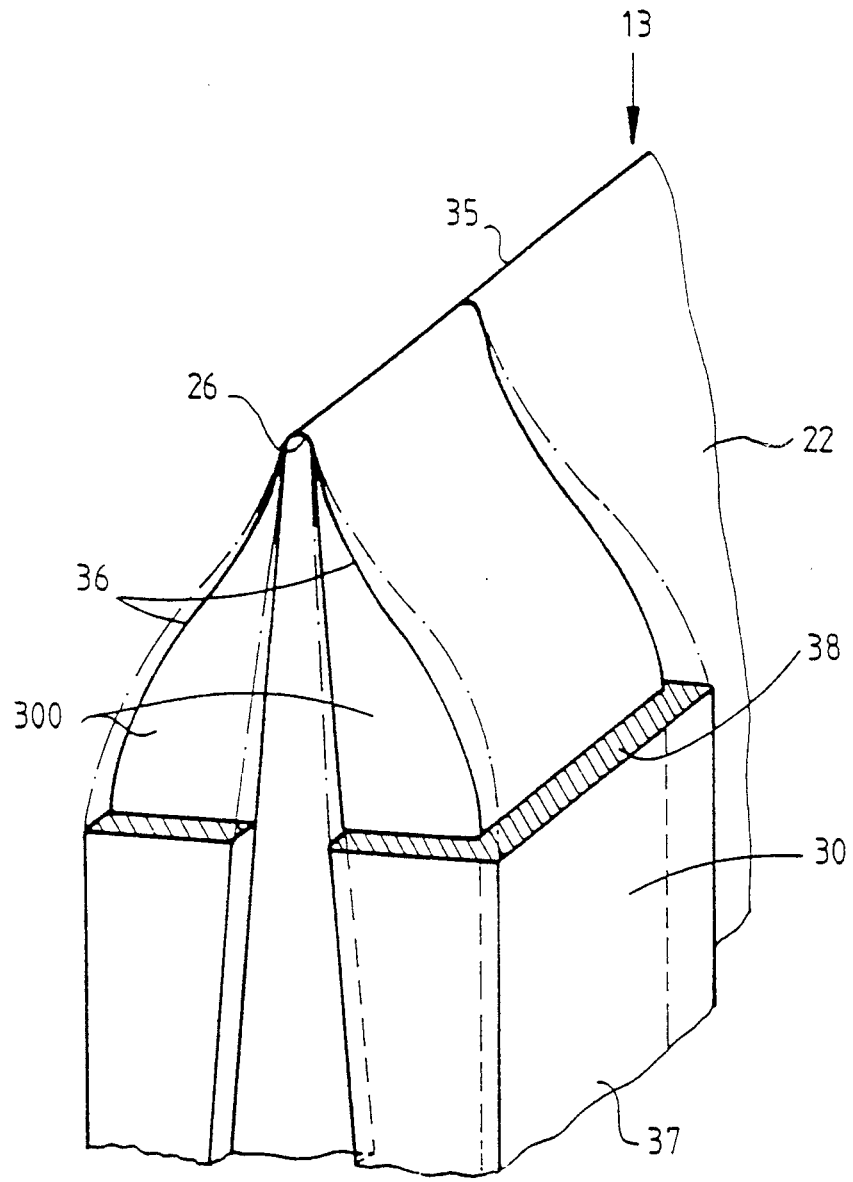
FIG. 2 is an enlargened view of detail A of FIG. 1a of the filter material.

The enlarged view of detail A of FIG. 1a in FIG. 2 shows the area of transition 36 between the fold edge 35 created by the fold 26 and the offset 30 protruding out of the fold wall 22.

The area of transition 36 extends from that end of the offset 30 which is the greatest distance away from the plane of the fold wall in the direction of the fold edge 35 in the plane of the fold wall 22. The area of transition 36 comprises an area of greater incline lying between two areas of lesser incline. In particular the areas of lesser incline continually and gradually run into the adjacent level areas. A rectangular area 37 is part of the contact area of two neighboring adjacent offsets 30 of the fold walls. The areas of transition 36 are formed to have good flow characteristics so that the resistance to flow, which can among other things build up at the offsets, be lessened.

The offset 30 and the area of transition 36 are coated with a layer of self-hardening and rigidifying adhesive 38 of which only a fragment which ends at the end of the offset 30 in the direction of the fold edge 35 is illustrated so as to enable better viewing of the shape and the position of the individual constructive elements. The filter can be soaked in adhesive 38 as an alternative to the layer of adhesive coating 38.

The layer of adhesive coating 38 continues and also covers the side faces 300 of the offsets 30 and the area of transition 36. The thickness of the adhesive coating 38 of the offset walls increases with increasing distance of the offset 30 from the fold wall 22. The thinner walls of the offsets 30 due to the pressing process and their accompanying lesser stability are compensated for by the application of the hardening adhesive coating 38 which increases the rigidity of the offsets 30. The offsets, due to the adhesive coating 38 are of the required rigidity and stability to be abe to stand up to the forces which act upon them during the filter process.

The adjacent offsets 30 which lie in contact with each other can be glued together by way of the layer of adhesive coating 38 on each offset. The filter cartridge 11 is thus stabilized and is able to retain its block-like form or block construction even without a frame. This means that the insertion of the filter cartridges 11 into the known filter casing 12 is greatly simplified.

Figure 3:
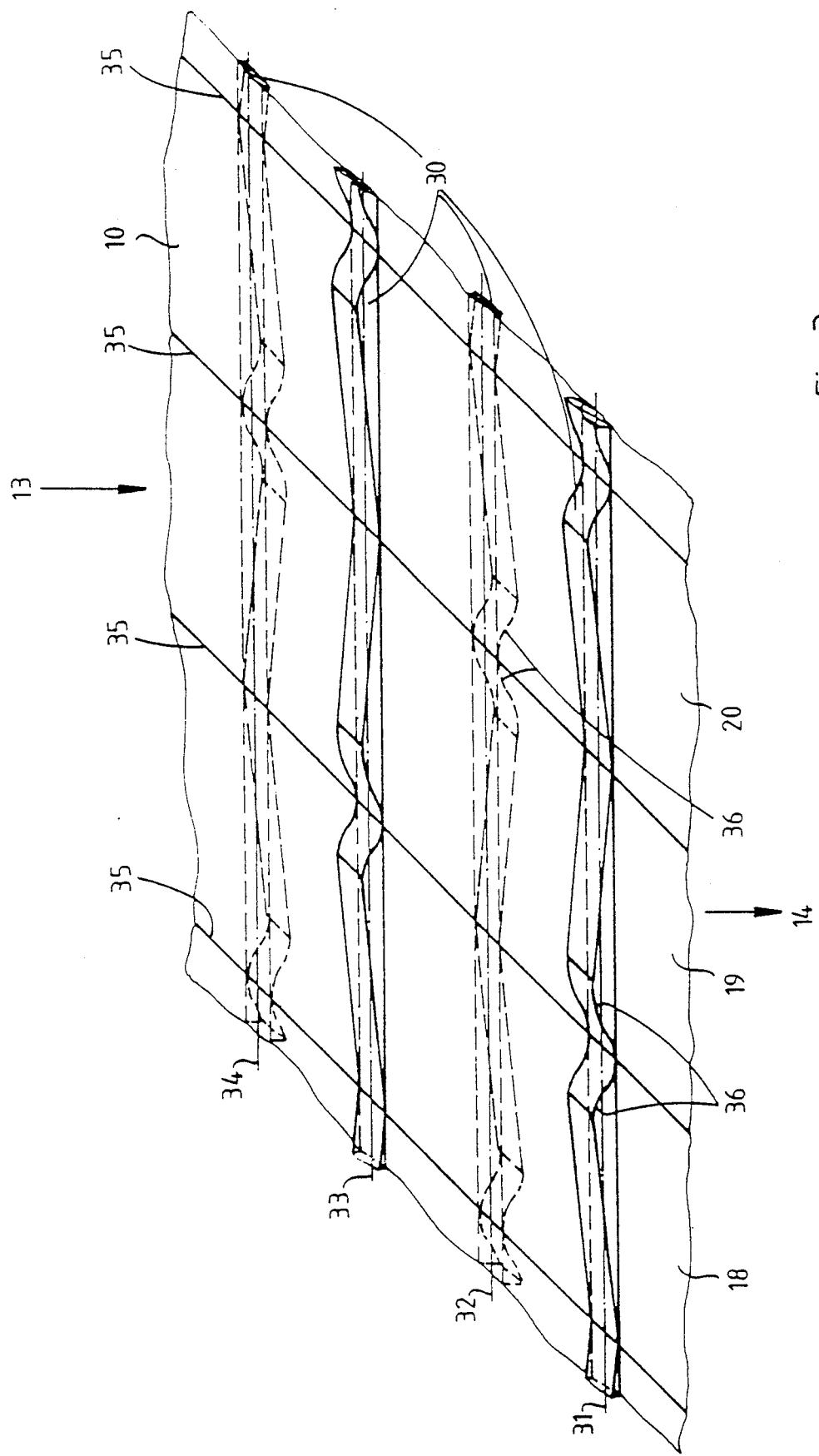
FIG. 3 is a perspective view of a part of the filter material in an unfolded state.

In FIG. 3 a part of the filter material 10 is illustrated in an unfolded state.

The offsets 30 can alternately be seen on the entrance side 13 and on the exit side 14 of the filter material. The offsets 30 are formed by passing the filter material 10 between two forming rolls, not illustrated. The filter material 10 passes through the forming rolls in a film-like fashion. In this manner offsets 30 with their respective areas of transition 36 and fold edges 35 are formed on the lines 31 to 34. Then the filter material 10 again passes between two rolls, not illustrated, which have recesses into which the formed offsets 30 can fit. The self-hardening layer of adhesive coating 38 is applied to the offsets 30 and their side faces 300 by these rolls. Not only is the production of filter elements with the forming rolls inexpensive but the application of the self-hardening layer of adhesive coating 38 by way of rolls is also an advantageous manufacturing technique.

A partial plan view of a filter cartridge 11 is illustrated in FIG. 4 in which two stabilizing threads 39 running parallel to one another are attached to the filter cartridge 11. The threads 39 are positioned perpendicularly to the fold edges 35 and connect the fold edges 35 together along the shortest path in the plan view. The threads are positioned on the surface of the filter cartridge 11. Starting from the fold edge 35 on the fold wall 40 the threads 39 run to the offset 30 of this fold wall 40 and along this offset until the point where this offset lies in contact with the offset 30 of the fold wall 41 opposite. The threads 39 then continue to run along the surface of the offset 30 of the fold wall 41 and along the fold wall 41 until they reach the next fold edge. The threads 39 surround the fold edges 35 and the fold walls (not illustrated) which are at the outer ends of the filter cartridge 11. The filter cartridge 11 is thus easy to handle and is highly stable which means that it can also be used for larger filters.

The threads consist of a homogenous foamy, sticky and/or a self-hardening plastic or a strip material such as cardboard or such like. In this way the threads 39 are stuck to the areas of the filter cartridge 11 they are in contact with. The threads 39 are prevented from slipping and the stability of the filter cartridge 11 is improved. The threads 39 which stabilize the filter cartridge 11 can, in a preferred embodiment, be positioned in the region of the fold walls (not illustrated) which are at the outer ends of the filter cartridge 11. The changing of the filter cartridge 11 is in this case quite unproblematic.

Figure 5:
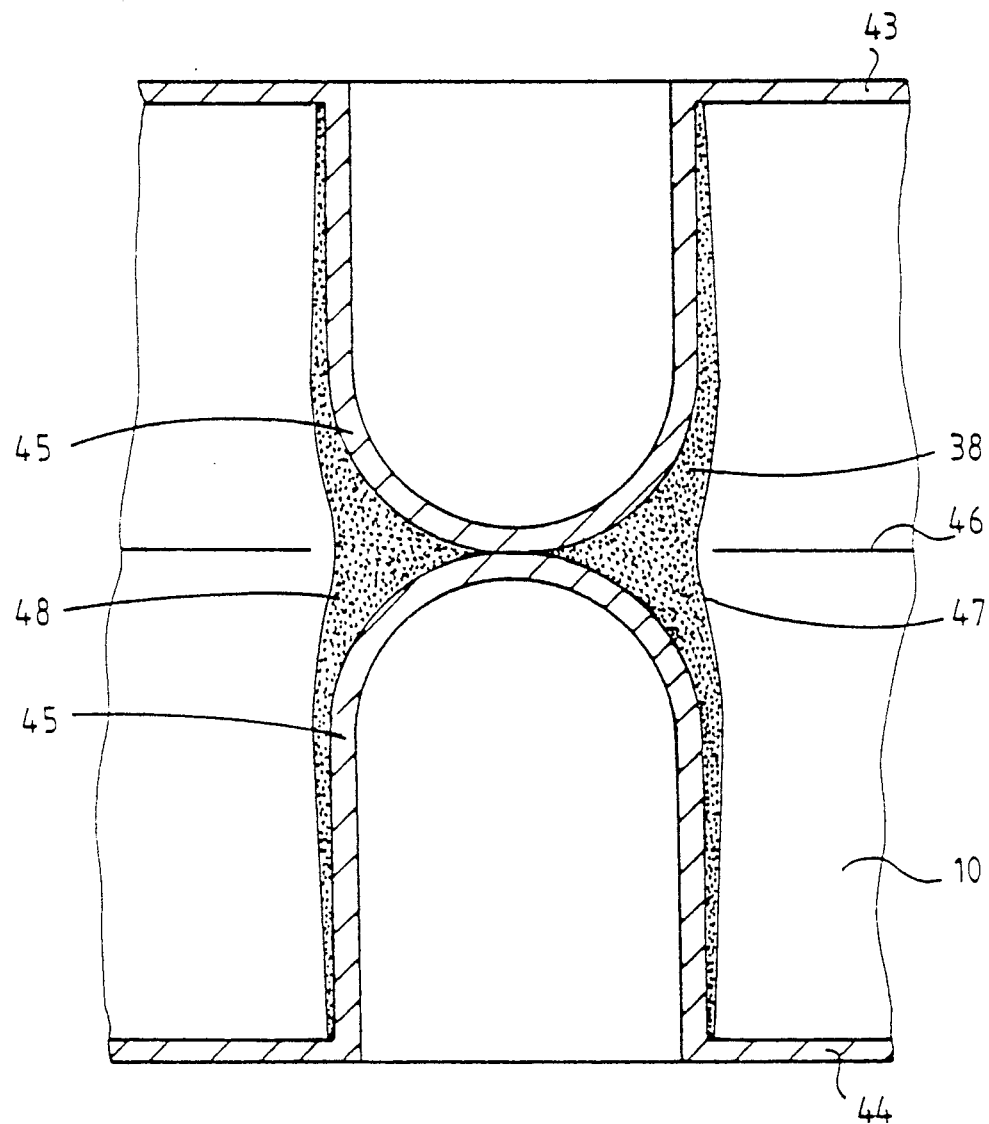
FIG. 5 is an enlargened section through two offsets of the fold walls which are in contact with each other and stuck together.

An enlargened section of two offsets is illustrated in FIG. 5. The two offsets 45 are formed in the fold walls 43 and 44. The height of the offsets 45 as measured from the plane of the fold walls 43 and 44 increases starting from the fold 46 in the direction of the opposite fold (not illustrated). The width of the offsets 45 is constant. In this case this width is smaller than the greatest height of the offset as measured from the plane of the fold walls 43 and 44. The offsets 45 thus have essentially the same characteristics as the already described offsets 30. The difference nevertheless lies in the round shape of the offsets 45. By choice these offsets can also be inclined.

The thickness of the layer of adhesive coating 38 of the offset walls also increases with increasing distance of the offset 45 from the respective fold wall 43 and 44.

The offsets 45 have linear contact and the layer of adhesive coating 38 is positioned on both sides of the linear contact so that the layer of adhesive coating forms side walls 47 and 48 with good flow characteristics. The layer of adhesive coating stabilizes the filter cartridge 11 which means that the spacing of the lines 31 to 34 on which the offsets 30 or 45 are positioned can be made larger. Due to the good flow characteristics of the side walls 47 and 48 the flow of the medium to be filtered is laminar. The resistance to flow is lowered as the number of offsets is reduced which in turn reduces the energy required for suction or throughput.

The filter material 10 comprises fibres which are of a thermoplastic material in another not illustrated embodiment of the invention. The amount of thermoplastic fibres present is sufficient to weld regions of the filter material 10 together by treating them locally with heat. The filter material 10 has thereby itself become more dense and more rigid and is connected to material of the same composition.

The fold edges 23 to 29 are made by pressure and/or heat treatment of the fibres which causes them to be welded together and are in the shape of a joint lines. In this case the fibres are connected together without any appreciable air voids. The permeable filter material 10 is nevertheless multi-layered. The outer layers are of polypropylene which is a thermoplastic material. This means that the filter characteristics can be adapted to the requirements of the manufacturing and the filter process by thermal treatment. The outer layers and the inner layers of the filter medium can be welded together in part, compacted and made more rigid. The initially slightly less stable walls of the offsets 30 caused by their formation process can be made more rigid again by thermal treatment.

The fold edges 23 to 29 are further formed in a trapezoid-like shape at the bottom of the folds. The pressure distribution is more even and, in particular, the fold wall can be of a greater height than in the other embodiments without undesirably high pressure differences occurring when the medium to be filtered passes through the filter material. These small pressure differences are, in particular, caused by the minimally greater concentration of material at the fold edge and could possibly also be caused by the medium to be filtered having a greater available filter surface area in this region. The advantageous laminar flow which is advantageous for the filter process still exists. The greater height of the fold walls does not only increase the filter area but betters all the filter characteristics and in particular the filter efficiency. The wider construction of the fold edge leads to a much better relationship of the pressure difference to the fold height. This leads to a greater rigidity and a longer operational life-span of each filter cartridge.

In another advantageous embodiment of the invention the adhesive material is placed on the offsets 30, in particular on the raised portions, in a net-like or spun fashion. In this way a total closure of the surface area of the filter material 10 is prevented. Even though the filter material 10 is rigid enough its filter characteristics are only slightly impaired. In addition the amount of adhesive material required is reduced so that the material costs are lowered.

It will be understood that the above description of the present invention is susceptible to various modifications, changes and adaptations, and the same are intended to be comprehended within the meaning and range of equivalents of the appended claims.

What is claimed is:

1. Filter cartridge having a block construction, comprising a plurality of zig-zag fold walls having fold edges between adjacent ones of said plurality of fold walls, said fold walls including a material folded in a zig-zag fashion for a medium to be filtered to pass through from one edge area of the plurality of zig-zag fold walls in the direction of the edge area of the opposite side of the fold walls, said filter material being made of a material which can be permeated by the medium to be filtered, said fold walls being provided with offsets which extend out on both sides of each fold wall in the direction of flow of the medium, and said offsets having side faces and a length which is greater than their width, wherein:

the offsets of adjacent fold walls lie in contact with one another to serve as spacers and stiffeners, and that the height of the offsets lying in contact with one another of two fold walls connected together by a said fold edge increases in the direction of the opposite fold edge and therefore the spacing between two adjacent fold walls decreases uniformly in the direction of flow of the medium until a point at which the medium to be filtered passes through the fold wall from which point on the spacing increases;

said offsets are of a constant width perpendicular to the direction of flow; and the side faces of said offsets extend perpendicularly to said fold edges which connect together said plurality of fold walls.

2. Filter cartridge as defined in claim 1, wherein only said offsets are covered with a self-stiffening, self-hardening layer.

3. Filter cartridge as defined in claim 2, wherein said layer covers said side faces of said offsets.

4. Filter cartridge as defined in claim 2, wherein the thickness of said layer increases with increasing distance of said offsets from said fold walls.

5. Filter cartridge as defined in claim 2, wherein said layer comprises an adhesive material.

6. Filter cartridge as defined in claim 5, wherein said adhesive material is disposed on said offsets in a net or spun fashion.

7. Filter cartridge as defined in claim 1, wherein only said offsets are soaked with a self-stiffening, self-hardening substance.

8. Filter cartridge as defined in claim 7, wherein said side faces of said offsets are soaked with said substance.

9. Filter cartridge as defined in claim 7, wherein the intensity of soaking with said substance increases with increasing distance of said offsets from said fold walls.

10. Filter cartridge as defined in claim 7, wherein said substance comprises an adhesive material.

11. Filter cartridge as defined in claim 1, wherein said offsets of adjacent fold walls which face one another are stuck together.

12. Filter cartridge as defined in claim 1, wherein said offsets of adjacent fold walls which face one another are in linear contact with each other and adhesive is disposed in the region of said linear contact.

13. Filter cartridge as defined in claim 1, wherein the area of transition between that end of said offset which is the greatest distance away from the plane of said fold wall in the direction of said fold edge in the plane of said fold wall comprises an area of greater incline between two areas of lesser incline of which the areas of lesser incline run continually and gradually into the adjacent level areas.

14. Filter cartridge as defined in claim 1, wherein at least one stabilizing thread is attached to said filter cartridge by being attached to and running substantially perpendicularly to said fold edges.

15. Filter cartridge as defined in claim 14, wherein said stabilizing thread is attached to said filter cartridge such that it runs in a substantially straight line along the surface of the offsets in contact with each other between two fold walls facing each other.

16. Filter cartridge as defined in claim 14, wherein said thread which stabilizes said filter cartridge is continuous and runs around said fold edges of said filter cartridge and said filter walls which are on the outer ends of said filter cartridge.

17. Filter cartridge as defined in claim 14, wherein said thread which stabilizes said filter cartridge acts as a guide when inserting said filter cartridge into a filter housing.

18. Filter cartridge as defined in claim 14, wherein said thread which stabilizes said filter cartridge comprises a foamy, sticky and self-hardening plastic.

19. Filter cartridge as defined in claim 1, wherein said fold edges are formed in a trapezoidal shape at the bottom of said folds.

20. Filter cartridge as defined in claim 1, wherein said permeable filter material comprises fibers of weldable thermoplastic material which weldable fibers increase the density of said filter material or which weldable fibers rigidify said filter material or which weldable fibers join said filter material together with another filter material when said weldable fibers are welded.

21. Filter cartridge as defined in claim 20, wherein it comprises seam regions in which said fibers are joined together without any appreciable air voids.

22. Filter cartridge as defined in claim 20, wherein said permeable filter material is weldable and comprises a plurality of layers, and a region of a layer is welded together.

23. Filter cartridge as defined in claim 20, wherein said permeable filter material comprises fibres or at least comprises in part fibres of polypropylene, cellulose, polycarbonate, polyamide, polytetrafluoroethylene and/or polyester.

24. Filter cartridge as defined in claim 20, wherein the outer layers of said filter material also comprise a weldable thermoplastic material and can be welded together to form seam areas.

25. Filter cartridge as defined in claim 24, wherein said seam welded areas are in the form of joint lines.

* * * * *